United States Patent
Lin et al.

(10) Patent No.: US 11,114,256 B2
(45) Date of Patent: Sep. 7, 2021

(54) SWITCHING APPARATUS AND ASSOCIATED SWITCH

(71) Applicant: ABB Schweiz AG, Baden (CH)

(72) Inventors: Zeming Lin, Xiamen (CN); Aki Suutarinen, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/820,123

(22) Filed: Mar. 16, 2020

(65) Prior Publication Data

US 2020/0219678 A1 Jul. 9, 2020

Related U.S. Application Data

(63) Continuation of application No. PCT/CN2018/105824, filed on Sep. 14, 2018.

(30) Foreign Application Priority Data

Sep. 15, 2017 (CN) .......................... 201710840575.8

(51) Int. Cl.
*H01H 9/24* (2006.01)
*H01H 3/04* (2006.01)

(52) U.S. Cl.
CPC ................ *H01H 9/24* (2013.01); *H01H 3/04* (2013.01)

(58) Field of Classification Search
CPC .. H01H 9/22; H01H 9/26; H01H 9/20; H01H 9/28; H01H 19/03; H01H 19/14; H01H 9/24; H01H 3/3031; H01H 3/42; H01H 9/06; H01H 9/0271; H01H 33/42; H01H 3/30; H01H 3/46; H01H 3/34; H01H 9/0027; H01H 9/167; H01H 9/286; H01H 9/282
See application file for complete search history.

(56) References Cited

U.S. PATENT DOCUMENTS 3,697,709 A 10/1972 Witkor
5,914,467 A 6/1999 Jonas et al.

FOREIGN PATENT DOCUMENTS

| CN | 201765982 U | 3/2011 |
| CN | 102368449 A | 3/2012 |
| CN | 103730283 A | 4/2014 |
| CN | 107068451 A | 8/2017 |
| DE | 9305858 U1 | 6/1993 |
| GB | 2002480 A | 2/1979 |

OTHER PUBLICATIONS

State Intellectual Property Office of the P.R. China, International Search Report & Written Opinion issued in corresponding Application No. PCT/CN2018/105824, dated Dec. 19, 2018, 10 pp.
European Search Report for EP Application No. 18856022.1 dated May 3, 2021.

*Primary Examiner* — Ahmed M Saeed
(74) *Attorney, Agent, or Firm* — Greenberg Traurig, LLP

(57) ABSTRACT

Implementations of the subject matter described herein provide a switching apparatus. The switching apparatus includes: a handle shaft coupled to a handle and arranged rotatable in a circumferential direction in response to an operation to the handle; and a locking plate arranged movable in a first direction in association with a rotation of the handle shaft. The handle shaft and the locking plate are operable to limit the rotation of the handle shaft when the handle shaft arrives at an off position of the switching apparatus.

14 Claims, 4 Drawing Sheets

SWITCHING APPARATUS AND ASSOCIATED SWITCH

CROSS REFERENCE TO RELATED APPLICATIONS

This application claims priority from Chinese Invention Patent Application No. 201710840575.8 with the invention name "Switching Apparatus and Associated Switch" filed on Sep. 15, 2017, the entire contents of which are incorporated herein by reference and form a part of this application.

FIELD

Various embodiments of the present disclosure relate to a switching apparatus and a switch associated therewith.

BACKGROUND

Electrical automatic transfer switch is commonly used in power distribution system for detecting and monitoring the power quality and transferring supply between normal power source and standby power source. Depending on the application scenarios, dual-power source automatic transfer switch is generally divided into two categories, that is, the two-working position switch (or briefly called two-position switch) and the three-working position switch (or briefly called three-position switch). For the three-position switch, the contact can stop at an off position where no connection is established with any power source. For two-position switch, the contact only transits between two power sources with no stop.

Moreover, the automatic transfer switch is always equipped with a handle to allow the user to operate the switch under the manual operation mode, even in the case that no electrical (or automatic) operation is available. The handle for use in the manual operation only have two positions for the two-position switch, which makes such handle simple and easy-to-operate. However, for the three-position switch, the handle has three positions. Thus, it could be dangerous if the user directly operates the switch to transfer the position from one power source (for example, supply I) to the other power source (for example, Power II) without a stop at the off position in the middle. It would be especially dangerous for the person who is operating the handle when current is still on.

SUMMARY

Implementations of the subject matter described herein provide a solution for preventing the handle from being operated directly from one working position to the other working position with no stop in the middle.

In first aspect of present disclosure, a switching apparatus for use in a switch is provided. The switching apparatus includes a handle shaft coupled to a handle and arranged rotatable in a circumferential direction in response to an operation to the handle. The apparatus further includes a locking plate arranged movable in a first direction in association with a rotation of the handle shaft. The handle shaft and the locking plate are operable to limit the rotation of the handle shaft, when the handle shaft arrives at an off position of the switching apparatus from one power source position for the first time.

During a transfer from one power source position (for example, Power I) to the other power source position (for example, Power II) under the manual operation, the apparatus will lock the handle shaft and thus effectively prevent the manual operation from Power I directly to Power II (or from Power II directly to Power I) without a stop at the off position in the middle. In other words, a self-lock construction is formed to limit a further rotation of the handle shaft when the handle shaft arrives at the off position from one power source position for the first time. The self-lock construction will be automatically released by itself only when the handle is pulled back a little. As such, in the next operation, the handle will be allowed to move forward to Power II.

Moreover, the switching apparatus according to various implementations of the present disclosure can be mounted inside a switch actuator of the switch to achieve a simple and space-saving construction.

In some implementations, the handle shaft includes a first pin, and the locking plate includes a first slot, and wherein the first pin is received by the first slot when the handle shaft arrives at the off position from one power source position for the first time to prevent a further rotation of the first pin in a positive circumferential direction.

In some implementations, the apparatus further includes a hook coupled to the locking plate. The hook includes an end oriented in a longitudinal direction, and the end passes through a hole on the locking plate.

In some implementations, the handle shaft includes a cam that is separated from the first pin by a first distance in the circumferential direction and by a second distance in the longitudinal direction, and the cam is in non-contact with the end of the hook when the first pin is received by the first slot.

Specifically, when the first pin is received by the first slot, the first slot limits the further movement of the handle shaft. Moreover, because the cam is not contacted with the hook, the cam cannot push off the hook to release, unless the locking plate is damaged or broken caused by a great external force applied on the handle shaft.

In some implementations, the switching apparatus further comprises: an output axis coaxially arranged with the handle shaft; a slider coupled to the output axis and arranged movable in the first direction in association with a rotation of the output axis; and a torsion spring adapted to apply a force to the locking plate, the torsion spring having a first end coupled to the locking plate and a second end coupled to the slider. Here, the position of slider may be used to reflect the contact status, because the output axis is directly connected with the contact, and the slider is coupled to the output axis.

In some implementations, the slider includes a slot having a bottom portion and a top portion, and the second end of the torsion spring is coupled to the slider via the slot.

In some implementations, the second end of the torsion spring is coupled to the top portion of the slot when the first pin is received by the first slot to cause the torsion spring to apply a force to the locking plate in a direction away from the output axis. However, due to the reception of the first pin into the first slot, the locking plate cannot be moved away.

The slot of the slider in combination with the torsion spring enables an easy and cost-effective way to actuate the locking plate. Meanwhile, a quick and reliable movement of the locking plate can be achieved.

In some implementations, the locking plate includes a second slot arranged to receive the first pin in the circumferential direction, and wherein the torsion spring applies the force to cause the locking plate to move away from the output axis when the first pin is released from the first slot along a negative circumferential direction, so as to align the first pin with the second slot in the circumferential direction.

In some implementations, the cam is adapted to push the end of the hook in a direction away from the output axis when the first pin is received by the second slot to allow the handle shaft to arrive at a second working position.

In some implementations, the handle shaft includes a second pin, and the locking plate further includes a third slot arranged to receive the second pin in the circumferential direction, and wherein the third slot is arranged substantially symmetrical to the second slot with respect to the first direction.

In some implementations, the locking plate is away from the output axis when the second pin is received by the third slot and the handle shaft is in a first working position.

In second aspect of present disclosure, a switch is provided. The switch comprises the switching apparatus according to the first aspect of the present disclosure.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

BRIEF DESCRIPTION OF THE DRAWINGS

The above and other objectives, features and advantages of the subject matter described herein will become more apparent through more detailed depiction of example implementations of the subject matter described herein in conjunction with the accompanying drawings, wherein in the example implementations of the subject matter described herein, same reference numerals usually represent same components.

Throughout the drawings, the same or similar reference symbols are used to indicate the same or similar elements.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below. A definition of a term is consistent throughout the description unless the context clearly indicates otherwise.

Figure 1:
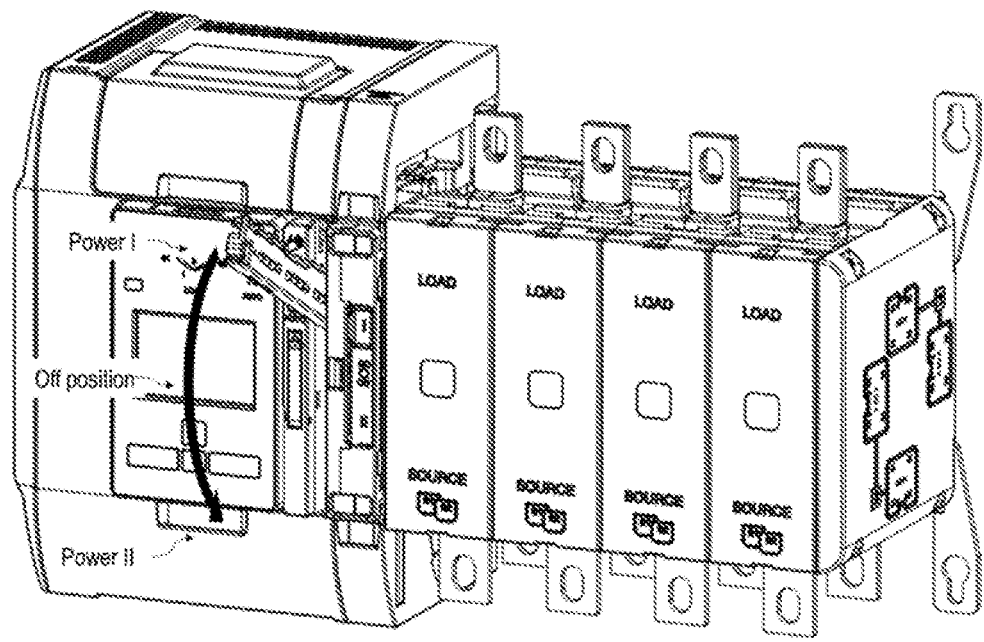
FIG. 1 is a perspective view of a typical three-position switch.

FIG. 1 is a perspective view of a three-position switch according to various implementations of the present disclosure. In some conventional designs, the three positions may not be arranged in a single line as shown in FIG. 1, which hinders a simple switching operation among different modes. In some other conventional designs, the three positions may be arranged in a single line, which enables a simple operation. However, it still brings difficulty to "precisely" control the operation of the handle, so that the handle can stop right at the off position.

In many circumstances, operators might need to operate the handle as fast as possible. As a result, in the conventional designs with three positions in a single line, the handle might easily go to the other position without stopping at the off position. It is against the operator's will, and moreover, it would possibly lead to an accident, especially when the current is not cut off yet. This is dangerous for the operator who is operating the handle as well as the downstream service man.

Figure 2:
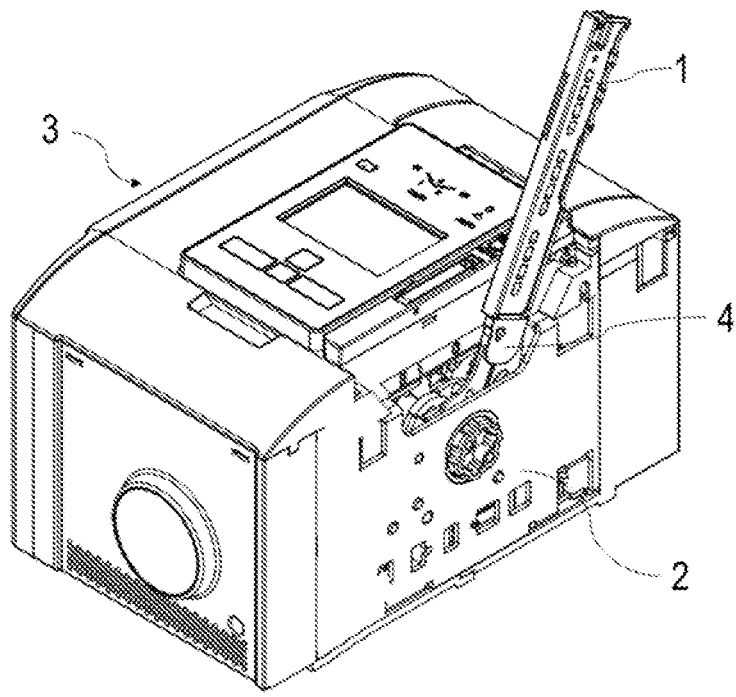
FIG. 2 shows a switching apparatus for use in a three-position switch according to an implementation of the present disclosure.

FIG. 2 shows a switching apparatus for use in a three-position switch according to an implementation of the present disclosure. As shown, the switching apparatus is accommodated in a housing 3 of the three-position switch. In this example, the switching apparatus is placed inside of the switch actuator 2 to simplify the whole construction and save the installation space. As further illustrated in FIG. 2, a handle 1 is coupled to (for example, inserted into) the handle shaft 4 of the switching apparatus from outside and used to receive the operator's switching operation under the manual mode.

FIGS. 3A-7B show various cross-sectional views of the switching apparatus under different operation positions according to implementations of the present disclosure. As shown, the switching apparatus generally includes a handle shaft 4 and a locking plate 6. The handle shaft 4 is coupled to the handle 1 and arranged rotatable in a circumferential direction C in response to an operation to the handle 1. The locking plate 6 is arranged movable in a first direction X in association with the rotation of the handle shaft 4. In this example, the first direction X is defined as the horizontal direction.

According to various implementations of the present disclosure, when the handle shaft 4 arrives at the off position of the switching apparatus from one power source position for the first time, the handle shaft 4 and the locking plate 6 are operable to limit the rotation of the handle shaft 4. In other words, a self-lock construction can be formed to limit a further rotation of the handle shaft, Now referring to FIGS. 3A-3B, in some implementations, the handle shaft 4 includes a pin $4_1$ (hereafter also referred to as a first pin), and the locking plate 6 includes a slot $6_1$ (hereafter also referred to as a first slot). The first pin $4_1$ can be received by the first slot $6_1$ when the handle shaft 4 arrives at the off position from one power source position for the first time to prevent a further rotation of the first pin $4_1$ in a positive circumferential direction denoted by "C+". In this example, the positive circumferential direction C+ is defined as the clockwise direction.

In some implementations, the switching apparatus may further include a hook 9 that is coupled to the locking plate 6. The hook 9 may include an end oriented in a longitudinal direction L, and the end passes through a hole $6_4$ on the locking plate 6. Accordingly, the handle shaft 4 may include a cam $4_3$ that is separated from the first pin $4_1$ by a first distance in the circumferential direction C and by a second distance in the longitudinal direction L. In this way, the cam $4_3$ will be limited to be in contact with the end of the hook 9 when the first pin $4_1$ is received by the first slot $6_1$.

In some implementations, the handle shaft 4 further includes a pin $4_2$ (hereafter also referred to as a second pin), and the locking plate 6 further includes a slot $6_3$ (hereafter also referred to as a third slot) arranged to receive the second pin $4_2$ in the circumferential direction C. In some implementations as illustrated in FIG. 3, the third slot $6_3$ can be arranged substantially symmetrical to the second slot $6_2$ with respect to the first direction X.

Figures 3A, 3B:
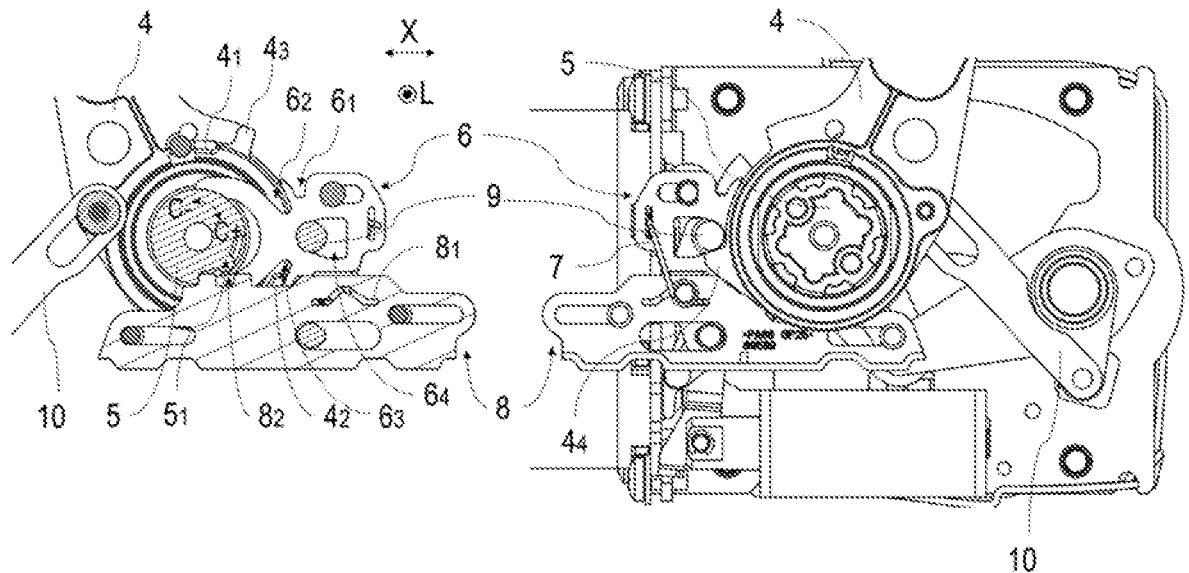
FIGS. 3A-3B show cross-sectional views of the switching apparatus for use in a three-position switch according to implementations of the present disclosure, where the switching apparatus is in a first working position (Power I)

In some implementations, the switching apparatus further includes an output axis 5, a slider 8 and torsion spring 7. The output axis 5 is coaxially arranged with the handle shaft 4. The slider 8 is coupled to the output axis 5 and arranged movable in the first direction X in association with a rotation of the output axis 5. Here, the position of slider 8 may be used to reflect the contact status, because the output axis 5 is directly connected with the contact, and the slider 8 is coupled to the output axis 5. In some implementations as illustrated in FIG. 3A, the slider 8 may be coupled with the output axis 5 via a teeth structure $8_2$ on the slider 8 and a teeth structure $5_1$ on the output axis 5. It is also to be understood that other coupling techniques between the slider 8 and the output axis 5 now known or later developed are also possible.

The torsion spring 7 is adapted to apply a force to the locking plate 6. In the example as illustrated in FIG. 3, the torsion spring 7 has a first end (or terminal) coupled to the locking plate 6 and a second end (or terminal) coupled to the slider 8. Although a torsion spring 7 is described in the above example implementations, it is to be understood that any other types of components that can apply force, either in a passive manner or in an active manner, to control the movement of the locking plate 6 should be envisaged by the skilled in the art.

In some implementations, the slider 8 includes a slot $8_1$ having a bottom portion and a top portion. In the implementations as shown in FIG. 3, the second end of the torsion spring 7 is coupled to the slider 8 via the slot $8_1$. It is also to be understood that other configurations or shapes of the slot is also possible.

Hereafter the mechanism of operations of the switching apparatus will be described with reference to the switching process from Power I to Power II. Still referring to FIG. 3, in the beginning, the contact is at the Power I position (hereafter also referred to as the first working position) and the slider 8 is on the right side. The terminal of torsion spring 7 now is located at the bottom of slot $8_1$, which causes a spring force directed to the output axis 5. However, as the pin $4_2$ of the handle shaft 4 is received inside the slot $6_3$ of locking plate 6, the movement of locking plate 6 is stopped.

Figure 4:
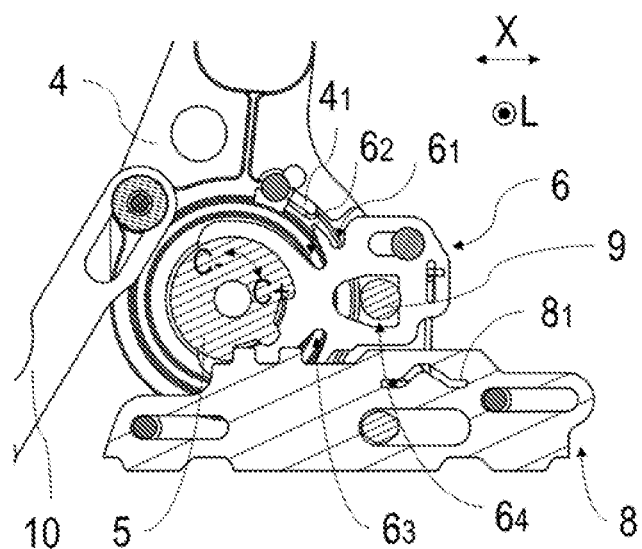
FIG. 4 shows cross-sectional views of the switching apparatus for use in the three-position switch according to an implementation of the present disclosure, where the switching apparatus is being transited between the first working position and an off position.

Once the handle 1 starts to operate (in this example, the handle 1 starts rotating clockwise, that is, in the positive circumferential direction C+), the handle shaft 4 will rotate and bring movement of a link 10 (as shown in FIG. 3B) to charge the main spring (not shown). The pin $4_2$ then moves away from slot $6_3$, and due to the spring force directed to the output axis 5, the locking plate 6 slides towards the output axis 5 (as shown in FIG. 4). Before the main spring charging is completed, the contact keeps closing, and the slider 8 just stays to allow the torsion spring 7 to keep pushing the locking plate 6 closer to the output axis 5.

Figures 5A, 5B:
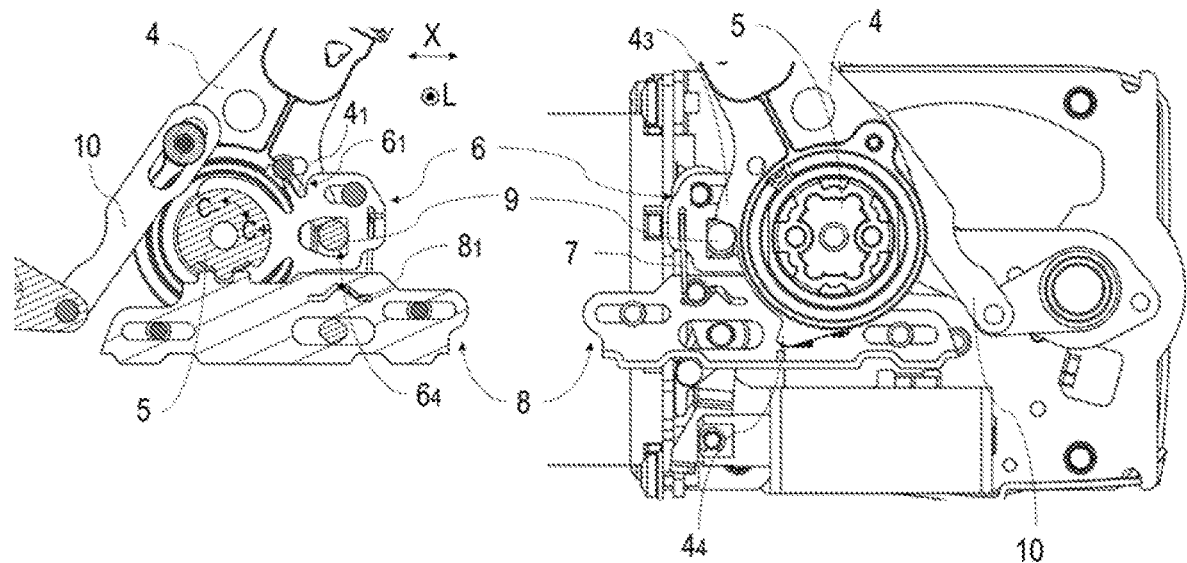
FIGS. 5A-5B show cross-sectional views of the switching apparatus for use in the three-position switch according to implementations of the present disclosure, where the switching apparatus is at the off position.

Now referring to FIGS. 5A and 5B, as the handle shaft 4 moves on, the pin $4_1$ goes into slot $6_1$ first, and then the main spring completes charging to start driving pole breaking. Once the contact arrives at the off position, that is, when the first pin $4_1$ is received by the first slot $6_1$, the slider 8 moves to the middle position and the terminal of torsion spring 7 is located at the top portion of slot $8_1$. In this way, the torsion spring 7 applies a force to the locking plate 6 in a direction away from the output axis 5. However, due to the reception of the first pin into the first slot, the locking plate cannot be moved away.

The above mentioned slot $8_1$ in combination with the torsion spring 7 enables an easy and cost-effective way to actuate the locking plate 6. Meanwhile, a quick and reliable movement of the locking plate 6 can be achieved.

Now, because the first slot $6_1$ is adapted to limit the handle shaft 4 to move further, the cam $4_3$ cannot contact with the hook 9, unless the locking plate is damaged or broken caused by a great external force applied on the handle shaft 4. However, in the case that some tolerance or deformation exist, the there is a possibility that cam $4_3$ may contact with the hook 9. In this case, if an external force continues to be applied on the handle shaft 4 towards the C+ direction, the handle shaft 4 would try to push the hook 9 away from the output axis 5, and as a consequence, the end of the hook 9 would try to push the locking plate 6 away. However, due to the deep reception of the pin $4_1$ of handle shaft 4 into the first slot $6_1$, the movement of the locking plate 6 likewise will be limited. As such, the handle shaft 4, the locking plate 6 and the hook 9 together form the self-lock construction to prevent the release of the handle shaft 4 from the off position.

Figures 6A, 6B:
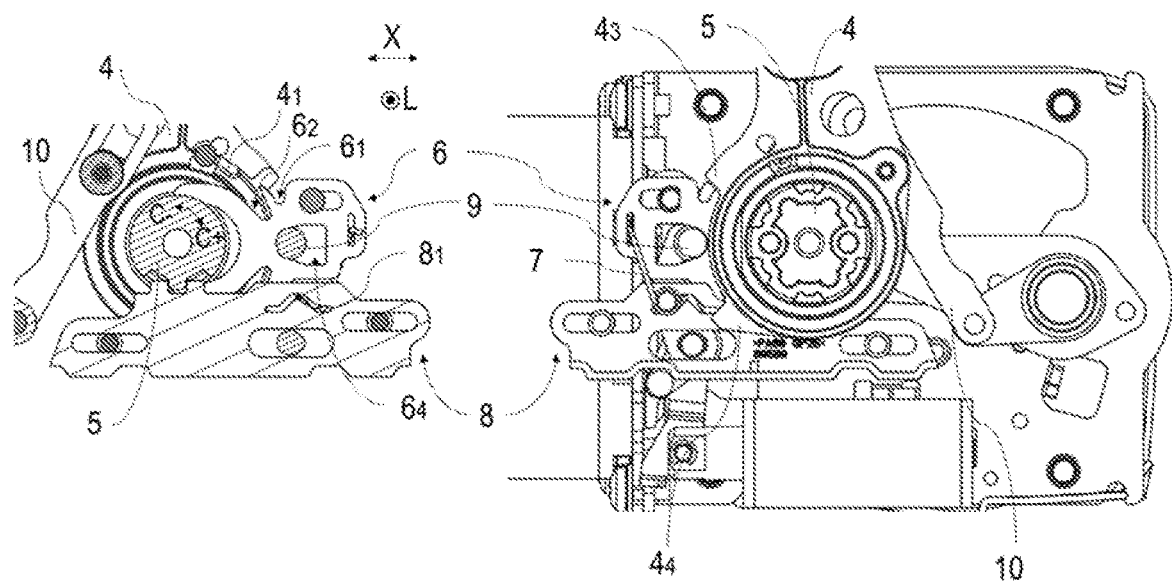
FIGS. 6A-6B show cross-sectional views of the switching apparatus for use in the three-position switch according to an implementation of the present disclosure, where the switching apparatus is released from the off position as shown in FIGS. 5A-5B.

Now referring to FIGS. 6A-6B, with application of the spring force as shown in FIGS. 5A-5B on the locking plate 6 in the direction away from the output axis 5, once the handle shaft 4 is moved back a little along a negative circumferential direction denoted by "C−" (in this example, the counter-clockwise direction) to allow the pin $4_1$ out from the slot $6_1$, the locking plate 6 will move away from the output axis 5 due to the force caused by the torsion spring 7, and then the self-lock construction is released.

As further illustrated in FIGS. 6A-6B, the locking plate 6 also includes a second slot $6_2$ that is arranged to receive the first pin $4_1$ in the circumferential direction C. After the first pin $4_1$ is released from the first slot $6_1$, the torsion spring 7 applies a force to cause the locking plate 6 to move away from the output axis 5, so as to align the first pin $4_1$ with the second slot $6_2$ in the circumferential direction C. In this way, in the next operation, when an external force is applied in the handle 1, the first pin $4_1$ will be received in the second slot $6_2$, and thus the handle shaft 4 can be moved to the Power II position.

Figures 7A, 7B:
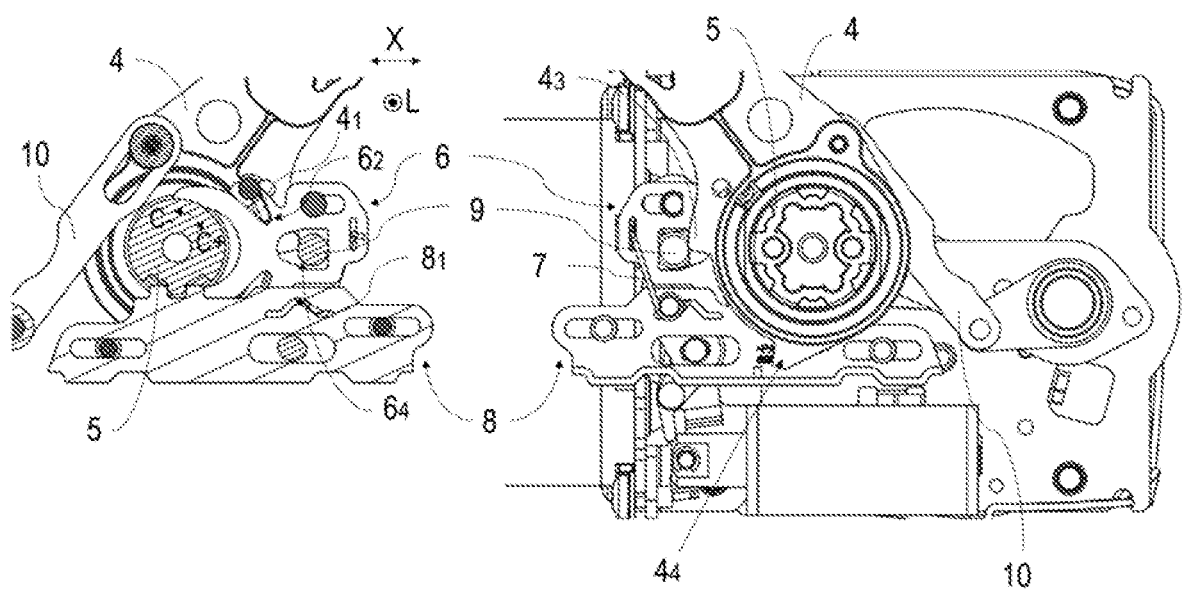
FIGS. 7A-7B show cross-sectional views of the switching apparatus for use in the three-position switch according to implementations of the present disclosure, where the switching apparatus is at the second working position (Power II).

Now referring to FIGS. 7A-7B, when the first pin $4_1$ is received in the second slot $6_2$, the hook 9 now can be pushed away by the cam $4_3$ to allow the contact to close. That is, the handle shaft 4 as shown in FIGS. 7A-7B arrives at the Power II position.

Although the operation procedure of the switching apparatus according to implementations of the present disclosure is described with reference to the switching process from Power I to Power II, those skilled in the art should understand that the operation procedure from Power II to Power I is the same as that from Power I to Power II.

For example, the locking plate 6 may further include a fourth slot arranged to receive the second pin $4_2$ in the circumferential direction. The fourth slot can be arranged substantially symmetrical to the first slot $6_1$ with respect to the first direction X. In this way, during the operation procedure from Power II to Power I, the fourth slot may function in a similar manner as the first slot $6_1$, and the third slot $6_3$ may function in a similar manner as the second slot $6_2$, due to the substantially symmetrical arrangement.

Furthermore, in some implementations as illustrated in FIG. 7B, the handle shaft 4 may further include a second cam $4_4$, which functions in a similar manner as the cam $4_3$. During the operation procedure from Power II to Power I, the second cam $4_4$ may similarly push off the hook 9 to release when the second pin $4_2$ is received in the third slot $6_3$ as shown in FIG. 3A.

What is claimed is:

1. A switching apparatus, comprising:
   a handle shaft coupled to a handle and arranged rotatable in a circumferential direction in response to an operation to the handle;
   a locking plate arranged movable in a first direction in association with a rotation of the handle shaft, and
   a hook coupled to the locking plate, wherein the hook includes an end oriented in a longitudinal direction, the end passing through a hole on the locking plate,
   wherein the handle shaft and the locking plate are operable to limit the rotation of the handle shaft, when the handle shaft arrives at an off position of the switching apparatus,
   wherein the handle shaft includes a first pin, and the locking plate includes a first slot,
   wherein the first pin is received by the first slot when the handle shaft arrives at the off position to prevent a further rotation of the first pin in a positive circumferential direction,
   wherein the handle shaft includes a cam that is separated from the first pin by a first distance in the circumferential direction and by a second distance in the longitudinal direction, and
   wherein the cam is in non-contact with the end of the hook when the first pin is received by the first slot.

2. The switching apparatus of claim 1, further comprising:
   an output axis coaxially arranged with the handle shaft;
   a slider coupled to the output axis and arranged movable in the first direction in association with a rotation of the output axis; and
   a torsion spring adapted to apply a force to the locking plate, the torsion spring having a first end coupled to the locking plate and a second end coupled to the slider.

3. The switching apparatus of claim 2, wherein the slider includes a slot having a bottom portion and a top portion, and the second end of the torsion spring is coupled to the slider via the slot.

4. The switching apparatus of claim 3, wherein the second end of the torsion spring is coupled to the top portion of the slot when the first pin is received by the first slot to cause the torsion spring to apply a force to the locking plate in a direction away from the output axis.

5. The switching apparatus of claim 3, wherein the locking plate includes a second slot arranged to receive the first pin in the circumferential direction, and
   wherein the torsion spring applies the force to cause the locking plate to move away from the output axis when the first pin is released from the first slot along a negative circumferential direction, so as to align the first pin with the second slot in the circumferential direction.

6. The switching apparatus of claim 4, wherein the cam is adapted to push the end of the hook in a direction away from the output axis when the first pin is received by the second slot to allow the handle shaft to arrive at a second working position.

7. The switching apparatus of claim 2, wherein the handle shaft includes a second pin, and the locking plate further includes a third slot arranged to receive the second pin in the circumferential direction, and
   wherein the third slot is arranged substantially symmetrical to the second slot with respect to the first direction.

8. The switching apparatus of claim 7, wherein the locking plate is away from the output axis when the second pin is received by the third slot and the handle shaft is in a first working position.

9. A switch, comprising a switching apparatus comprising:
   a handle shaft coupled to a handle and arranged rotatable in a circumferential direction in response to an operation to the handle;
   a locking plate arranged movable in a first direction in association with a rotation of the handle shaft, and
   a hook coupled to the locking plate, wherein the hook includes an end oriented in a longitudinal direction, the end passing through a hole on the locking plate,
   wherein the handle shaft and the locking plate are operable to limit the rotation of the handle shaft, when the handle shaft arrives at an off position of the switching apparatus,
   wherein the handle shaft includes a first pin, and the locking plate includes a first slot,
   wherein the first pin is received by the first slot when the handle shaft arrives at the off position to prevent a further rotation of the first pin in a positive circumferential direction,
   wherein the handle shaft includes a cam that is separated from the first pin by a first distance in the circumferential direction and by a second distance in the longitudinal direction, and
   wherein the cam is in non-contact with the end of the hook when the first pin is received by the first slot.

10. The switch of claim 9, further comprising:
    an output axis coaxially arranged with the handle shaft;
    a slider coupled to the output axis and arranged movable in the first direction in association with a rotation of the output axis; and
    a torsion spring adapted to apply a force to the locking plate, the torsion spring having a first end coupled to the locking plate and a second end coupled to the slider.

11. The switch of claim 10, wherein the slider includes a slot-having a bottom portion and a top portion, and the second end of the torsion spring is coupled to the slider via the slot.

12. The switch of claim 11, wherein the second end of the torsion spring is coupled to the top portion of the slot when the first pin is received by the first slot to cause the torsion spring to apply a force to the locking plate in a direction away from the output axis.

13. The switch of claim 11, wherein the locking plate includes a second slot arranged to receive the first pin in the circumferential direction, and
   wherein the torsion spring applies the force to cause the locking plate to move away from the output axis when the first pin is released from the first slot along a negative circumferential direction, so as to align the first pin with the second slot in the circumferential direction.

14. The switch of claim 12, wherein the cam is adapted to push the end of the hook in a direction away from the output axis when the first pin is received by the second slot to allow the handle shaft to arrive at a second working position.

* * * * *